March 1, 1966 A. S. MERRIAM 3,238,461

ASYNCHRONOUS BINARY COUNTER CIRCUITS

Filed Oct. 11, 1963

INVENTOR.
ANN S. MERRIAM
BY
Attorney

United States Patent Office 3,238,461
Patented Mar. 1, 1966

3,238,461

ASYNCHRONOUS BINARY COUNTER CIRCUITS

Ann S. Merriam, Merion Station, Pa., assignor to Radio Corporation of America, a corporation of Delaware Filed Oct. 11, 1963, Ser. No. 315,629
6 Claims. (Cl. 328—41)

This invention relates to new and improved binary counter circuits.

The circuits of the invention are useful in "asynchronous" data processing machines. Asynchronism implies that each operation in a group of sequential operations performed by the machine occurs in response to a signal indicative of the completion of the preceding operation. The time required to complete each operation may be variable. This contrasts with synchronous data processing machine operation, wherein each operation is performed in response to (in "synchronism" with) a clock pulse, and the clock pulses occur during fixed, regularly spaced time intervals.

In the circuits of the invention, each stage of the counter includes a pulse producing circuit. Each such circuit produces an output pulse in response to a change, in a given sense, of the storage state of its stage. For example, each pulse producing circuit may be connected to produce an output in response to the 0–1 transistion of its counter stage. In addition, the last (the highest order) counter stage includes a circuit for producing an output pulse in response to a change in the opposite sense (a 1–0 transition in this example) in the storage state of the last counter stage. A circuit which is common to all of the pulse producing circuits produces a carry propagation complete pulse, in response to each input pulse to the counter, only after a period which is a function of the time, in each case, for the counter to settle down to its new count.

Figure 1A:
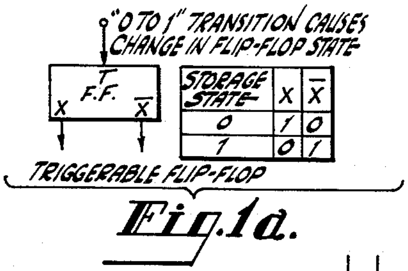
Figure 1B:
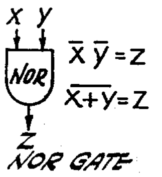
Figure 1C:
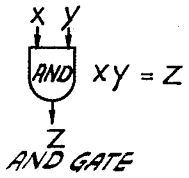
Figure 1D:
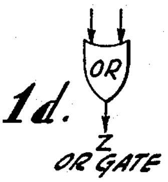
Figure 1E:
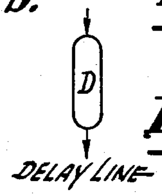
Figure 2:
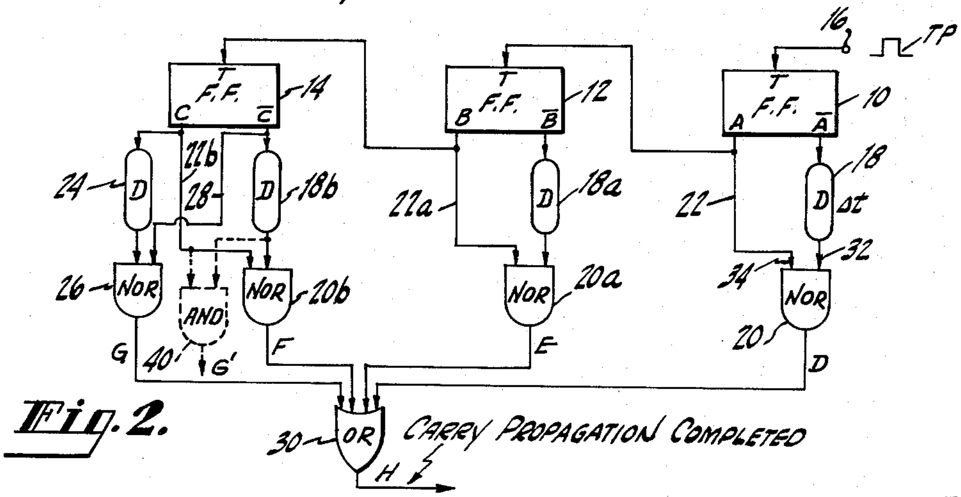
Figure 3:
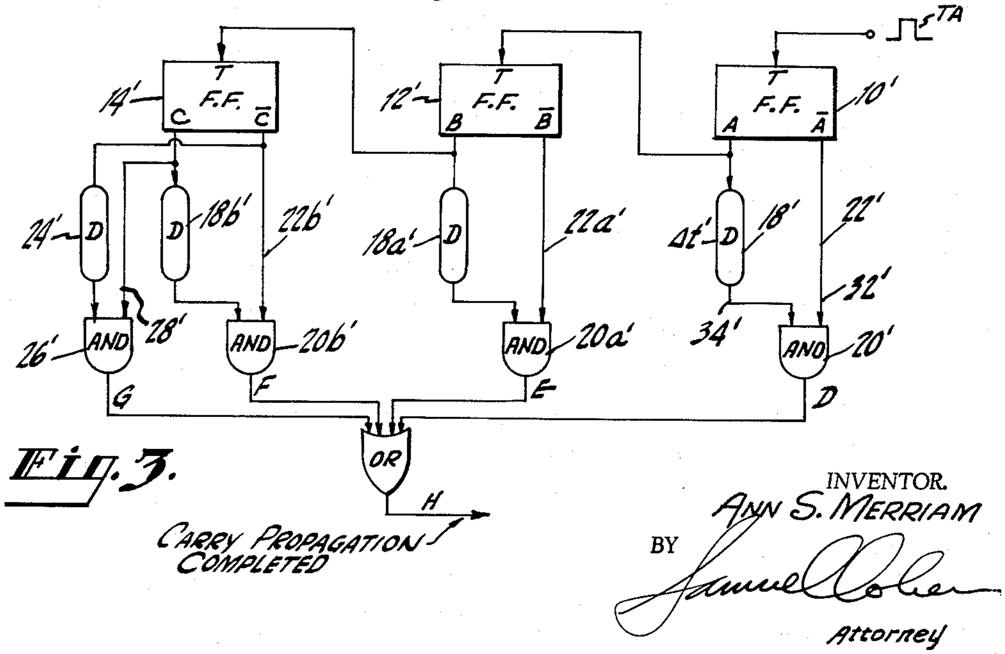

The invention is discussed in greater detail below and is illustrated in the following drawings of which:

FIGS. 1*a* through 1*e* are schematic drawings of the conventions employed in FIGS. 2 and 3;

FIG. 2 is a block circuit diagram of one embodiment of a counter according to the invention; and FIG. 3 is a block circuit diagram of a second embodiment of a counter according to the invention.

FIGS. 1*a*–1*e* are more or less self-explanatory. The convention arbitrarily adopted, for purposes of the present explanation, is that a binary 0 is represented by a relatively low value of voltage and a binary 1 is represented by a relatively high value of voltage. Thus, in FIG. 1*a* when the input voltage applied to the trigger (T) terminal changes from a low level to a high level (from a 0 to a 1), the flip-flop changes its storage state.

The three logic gates shown in FIGS. 1*b*, *c* and *d* are NOR, AND and OR gates respectively, and their operation is succinctly given by the Boolean equations appearing next to the respective gates. These gates and the flip-flops receive inputs and produce outputs which represent binary digits (bits). For the sake of convenience, such inputs are sometimes referred to in the discussion which follows as 1's or 0's rather than as signals, voltages or levels manifesting such bits.

The counter of FIG. 2 includes three triggerable flip-flops 10, 12 and 14, respectively. Input timing pulses (TP) are applied to the trigger terminal 16 of the lowest order flip-flop 10. The unbarred output terminal of flip-flop 10 is connected to the trigger input terminal T of flip-flop 12 and the unbarred output terminal of flip-flop 12 is connected to the trigger input terminal T of flip-flop 14.

The barred output terminals of the respective flip-flops are connected through delay lines 18, 18*a* and 18*b*, respectively, to one input terminal of NOR gates 20, 20*a* and 20*b*, respectively. The unbarred output terminals of the respective flip-flops are directly connected, via leads 22, 22*a* and 22*b*, respectively, to the second input terminal of the respective NOR gates. The flip-flop 14, which stores the bit of highest rank, is connected at its unbarred output terminal through a delay line 24 to an input terminal of NOR gate 26. The barred output terminal of flip-flop 14 is directly connected via lead 28 to the second input to NOR gate 26. All of the NOR gates are connected to a common OR gate 30. This OR gate produces a "carry propagation complete" signal H, as is discussed shortly.

In the operation of the circuit of FIG. 2, all of the flip-flops are initially in their 0 storage state. In other words, each flip-flop initially produces a low voltage level (binary 0) at its barred output terminal and a high voltage level (binary 1) as its unbarred output terminal. A 0 is therefore initially present at input lead 32 to NOR gate 20 and a 1 is initially present at input lead 34 to NOR gate 20. Accordingly, this NOR gate is initially disabled.

When the first timing pulse TP–1 is applied to input terminal 16, a flip-flop 10 changes its storage state. In other words $\overline{A}$ changes to 1 and A changes to 0. The $A=0$ is applied immediately to NOR gate 20. However, the $\overline{A}=1$ does not reach NOR gate 20 until after the time delay $\Delta t$ inserted by delay line 18. Therefore, during the interval $\Delta t$ after the flip-flop 10 switches from its 0 to its 1 state, both input leads 32 and 34 of the NOR gate 20 carry a 0, whereby the NOR gate is enabled and produces a $D=1$ output. Upon the completion of the delay interval $\Delta t$, the bit present at input lead 32 of the NOR gates changes from a 0 to 1 inactivating the NOR gate whereby D becomes 0.

The $D=1$ output of NOR gate 20 is applied to OR gate 30 which thereupon produces an $H=1$ output. $H=1$ is a carry propagation complete pulse. This pulse indicates that the timing pulse TP applied to the counter has completed incrementing the count stored in the counter by 1. In other words, no carry will propagate after $H=1$ occurs, until the next timing pulse is applied to terminal 16. In the present example of a change in the count from 000 to 001, the time required after the application of TP–1 for H to become equal to 1, is the time necessary for the first stage, flip-flop 10, to switch from its 0 to its 1 state. The $H=1$ signal indicates to the data processing machine of which the counter of FIG. 2 may be a part that the counter has settled to its new count and that the next operation the machine is to perform involving the counter can commence.

In response to the second timing pulse TP–2 applied to input terminal 16 flip-flop 10 changes from the 1 back to the 0 storage state. The NOR gate 20 is not enabled by a 1–0 transition of flip-flop 10 so that D remains 0. However, the 1–0 transition of flip-flop 10 corresponds to a change in the unbarred output of the flip-flop from $A=0$ to $A=1$. This transition is a triggering impulse for flip-flop 12 and, in response thereto, flip-flop 12 changes from the 0 to the 1 storage state. The second pulse producing circuit, consisting of delay line 18*a*, NOR gate 20*a*, and direct connection 22*a* thereupon produces an output $E=1$. E serves as an input to OR gate 30 so that when E changes to 1, H, the carry propagation complete pulse, also changes to 1.

The timing pulse TP–2 causes the count recorded in the counter to change from 001 to 010. The time required for the counter to settle to the new count is two counter stage delays. The input triggering pulse causes flip-flop 10 to change its state. This is the first stage delay. The change in state of flip-flop 10 causes flip-flop 12 to change its state. This is the second stage delay. The pulse $H=1$ starts after these two stage delays and again indicates that the counter has settled to its new count.

The table below illustrates the remainder of the operation of the circuit of FIG. 2. Each time a pulse D, E, F or G is generated, the carry propagation complete pulse H occurs. It is clear from the table that the time at which H occurs is a function of the number of stage delays required for the counter to settle.

| Flip-Flop Storage State | | | Timing pulse | Output of Gates in Response to T.P. | | | | Number of Flip-Flop Stage Delays Required for Counter to "Settle" |
|---|---|---|---|---|---|---|---|---|
| $\overline{C}$ | $\overline{B}$ | $\overline{A}$ | | G | F | E | D | |
| 0 | 0 | 0 | | | | | | |
| 0 | 0 | 1 | TP-1 | 0 | 0 | 0 | 1 | 1 |
| 0 | 1 | 0 | TP-2 | 0 | 0 | 1 | 0 | 2 |
| 0 | 1 | 1 | TP-3 | 0 | 0 | 0 | 1 | 1 |
| 1 | 0 | 0 | TP-4 | 0 | 1 | 0 | 0 | 3 |
| 1 | 0 | 1 | TP-5 | 0 | 0 | 0 | 1 | 1 |
| 1 | 1 | 0 | TP-6 | 0 | 0 | 1 | 0 | 2 |
| 1 | 1 | 1 | TP-7 | 0 | 0 | 0 | 1 | 1 |
| 0 | 0 | 0 | TP-8 | 1 | 0 | 0 | 0 | 3 |

The last counter stage 14 requires 2 pulse producing circuits. The circuit 18*b*, 20*b*, 22*b* produces an $F=1$ output in response to the 0–1 transition of flip-flop 14. This occurs in response to timing pulse TP–4 after three stage delays. The pulse producing circuit 24, 28, 26 produces an output pulse $G=1$ in response to the 1–0 transition of flip-flop 14. It occurs in response to the eighth timing pulse TP–8, which resets the counter to its original condition-storing 000. $G=1$ occurs after three stage delays. The $G=1$ output may properly be termed an overflow indication.

In a modified form of the circuit of FIG. 2 an AND gate 40, connected as shown, replaces the NOR gate 27 and the delay line 24. The output pulse G′ produced by this gate is in response to a 1–0 transition of flip-flop 14 and may be applied to OR gate 30. An advantage of this arrangement is that there is a saving of one delay line.

An important advantage of the circuit of FIG. 2 (and also of the circuit of FIG. 3) over synchronous binary counters is the saving in time which is made possible. In a synchronous counter, it is always necessary to wait an amount of time, after a triggering pulse is applied to the counter and before the next operation can start, which is equal to the longest possible time it may take the counter to settle down (the worst case condition). In the case of a three-stage counter such as described, it would be necessary, in each case, to wait three stage delays (plus a small amount of additional time, as a safety factor). In the present asynchronous counter, the next operation can start, in each case, immediately after the counter settles. The average settle down time is 1¾ stage delays. As the size of the counter increases the proportional saving in time increases. For example, a four stage asynchronous counter according to the invention settles down, on the average, in 1⅞ stage delays, compared to the worst case condition of four stage delays. A fifty-six stage asynchronous counter settles down, on the average, in approximately 2 stage delays, compared to the worst case condition of fifty-six stage delays.

The embodiment of the invention shown in FIG. 3 is analogous to the one of FIG. 2 and similar reference numerals primed are applied to identify similar circuit elements. The circuit of FIG. 3 employs AND gates rather than NOR gates. It is therefore necessary, using the conventions given, to connect the AND gates directly to the barred terminals of the flip-flops and through the delay lines to the unbarred terminals of the flip-flops.

In the operation of the circuit of FIG. 3, the counter initially stores the count 000. The output of flip-flop 10 is therefore $A=1$, $\overline{A}=0$. When the first timing pulse TP–1 occurs, $\overline{A}$ changes to 1 and A changes to 0. $\overline{A}=1$ reaches the AND gate 20′ immediately. But, $A=0$ does not reach the AND gate until after the time delay $\Delta t'$ inserted by the delay line 18′. Therefore, during the interval $\Delta t'$, the two inputs to AND gate 20′ are 1, the AND gate becomes enabled, and the output $D=1$ is produced. The $D=1$ applied to OR gate 30 causes the OR gate to produce the carry propagation completed pulse $H=1$. After the interval $\Delta t'$, the bit on lead 34′ changes to 0 whereupon the AND gate becomes disabled and both D and H change back to 0.

The remainder of the operation of the circuit of FIG. 3 easily may be followed from the explanation of FIG. 2 above. The table above applies both to FIGS. 3 and 2.

While not critical, it is usual that all of the delay lines in a counter such as described insert substantially the same delay. This delay can be relatively short, if desired. The delay interval, in each case, will depend upon the pulse duration desired for H.

The invention has been illustrated in terms of three stage counters to simplify the explanations. It is to be understood, of course, that the invention is equally applicable to counters of any number (such as $n$) of stages. It is also to be understood that, in the circuit of FIG. 3, a NOR gate 1–0 transition pulse producing circuit may be substituted for the AND gate pulse producing circuit 24′ 26′ 28′, in a manner analogous to that shown in FIG. 3 for the substitution of the AND gate 40 for the NOR gate circuit 26, 24, 28.

What is claimed is:

1. In combination, a multiple stage counter, each such stage being capable of assuming either one of a "zero" and a "one" state;

a plurality of means, one per stage, each means for generating an output in response to a "zero" to "one" transistion of its stage;

another means, this one coupled to the stage of the counter representing the binary digit of highest rank, for generating an output in response to a "one" to "zero" transition of the stage representing the bit of highest rank; and a circuit coupled to all of said means, for producing an output in response to an output from any of said means.

2. In combination, a multiple stage, triggerable flip-flop counter, each flip-flop of said counter having a first and a second output terminal, one terminal for producing an output indicative of a digit and the other terminal for producing an output indicative of the complement of the binary digit;

a plurality of delay means, one for each flip-flop;

a plurality of two input coincidence gates, one for each flip-flop, one input of each gate being connected directly to the first output terminal of its flip-flop, and the other input of each gate being connected through a delay means to the second output terminal of its flip-flop;

and an OR gate connected to receive the outputs of the respective coincidence gates.

3. In combination, a multiple stage, triggerable flip-flop counter, each flip-flop of said counter having a first and a second output terminal, one terminal for producing an output indicative of a binary digit and the other terminal for producing an output indicative of the complement of the binary digit;

a plurality of delay means;

a plurality of two input coincidence gates, one for each counter, each for producing an output in response to a change in flip-flop stage in the same sense, one input of each gate being connected directly to the first output terminal of its flip-flop, and the other input of each gate being connected through a delay means to the second output terminal of its flip-flop;

an additional two input coincidence gate, this one for producing an output in response to a change in the state of its flip-flop in the opposite sense, one input of said additional gate being connected directly to one of the output terminals of the flip-flop storing the binary digit of highest rank, and the other input of said additional gate being connected through one of said delay means to the other output terminal of the same flip-flop;

and an OR gate connected to receive the outputs of the respective coincidence gates.

4. The combination set forth in claim 3 wherein all of said coincidence gates are NOR gates.

5. The combination set forth in claim 3 wherein all of said coincidence gates are AND gates.

6. A binary counter comprising, a plurality of triggerable flip-flops, each representing a binary digit of different rank, each except the flip-flop representing the bit of lowest rank changing its storage state in response to a change in a given sense of the storage state of the immediately preceding flip-flop, and said flip-flop representing the binary digit of lowest rank being receptive of input trigger pulses, and changing its state in response to each said pulse;

a plurality of pulse producing circuits, one per flip-flop, each for producing an output pulse in response to a change in said given sense of the storage state of its flip-flop;

a pulse producing circuit coupled to the one of said flop-flops representing the bit of highest rank for producing an output pulse in response to a change in an opposite sense of the storage state of said last-mentioned flip-flop; and a circuit common to all of said pulse producing circuits for producing an output each time one of said pulse producing circuits produces a pulse.

References Cited by the Examiner

UNITED STATES PATENTS

| | | | |
|---|---|---|---|
| 3,028,552 | 4/1962 | Hahs | 328—55 |
| 3,107,332 | 10/1963 | Paoletti et al. | 328—63 |

ARTHUR GAUSS, *Primary Examiner.*